United States Patent
Zhinong et al.

(10) Patent No.: US 10,587,328 B2
(45) Date of Patent: Mar. 10, 2020

(54) OPERATING A WIRELESS COMMUNICATION SYSTEM

(71) Applicant: Sony Mobile Communications, Inc., Tokyo (JP)

(72) Inventors: Ying Zhinong, Lund (SE); Peter Karlsson, Lund (SE); Erik Bengtsson, Eslov (SE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/065,138

(22) PCT Filed: Dec. 22, 2015

(86) PCT No.: PCT/EP2015/081082
§ 371 (c)(1),
(2) Date: Jun. 22, 2018

(87) PCT Pub. No.: WO2017/108117
PCT Pub. Date: Jun. 29, 2017

(65) Prior Publication Data
US 2019/0007121 A1 Jan. 3, 2019

(51) Int. Cl.
*H04B 7/08* (2006.01)
*H04B 7/06* (2006.01)
(Continued)

(52) U.S. Cl.
CPC ......... *H04B 7/0689* (2013.01); *H04B 7/0604* (2013.01); *H04B 7/0691* (2013.01);
(Continued)

(58) Field of Classification Search
None
See application file for complete search history.

(56) References Cited

U.S. PATENT DOCUMENTS

2010/0309872 A1* 12/2010 Amini .................. H04L 12/413
370/329
2013/0235746 A1* 9/2013 Patel ................. H04W 72/0453
370/252
(Continued)

FOREIGN PATENT DOCUMENTS

WO 20080077629 A1 7/2008
WO 2010146454 A1 12/2010
(Continued)

*Primary Examiner* — Angel T Brockman
(74) *Attorney, Agent, or Firm* — Renner, Otto, Boisselle & Sklar, LLP

(57) ABSTRACT

The present invention relates to a method for operating a wireless communication system. The wireless communication system comprises a base station and a terminal. The terminal comprises a plurality of antenna elements and provides at least two antenna array configurations comprising a first antenna array configuration comprising at least two antenna elements having same radio transmission characteristics and a second antenna array configuration comprising at least two antenna elements having different radio transmission characteristics. According to the method, a selection process for selecting and an antenna array configuration of the at least two antenna array configurations is triggered and for each of the at least two antenna array configurations a corresponding figure of merit is determined. The corresponding figure of merit is determined based on corresponding pilot signals received from the base station via the corresponding antenna array configuration. Depending on the figures of merit, an antenna array configuration is activated.

14 Claims, 2 Drawing Sheets

(51) Int. Cl.
*H04B 17/10* (2015.01)
*H04B 17/18* (2015.01)
*H04B 17/29* (2015.01)
*H04B 17/26* (2015.01)

(52) U.S. Cl.
CPC ......... *H04B 7/0814* (2013.01); *H04B 7/0822* (2013.01); *H04B 7/0825* (2013.01); *H04B 7/0874* (2013.01); *H04B 17/104* (2015.01); *H04B 17/18* (2015.01); *H04B 17/26* (2015.01); *H04B 17/29* (2015.01)

(56) References Cited

U.S. PATENT DOCUMENTS

2014/0140224 A1  5/2014  Haakansson et al.
2014/0220902 A1  8/2014  Clevorn et al.

FOREIGN PATENT DOCUMENTS

WO  2014045096 A1  3/2014
WO  2015130292 A1  9/2015

\* cited by examiner

OPERATING A WIRELESS COMMUNICATION SYSTEM

RELATED APPLICATIONS

This application is a national phase entry of International Application No. PCT/EP2015/081082 filed on Dec. 22, 2015 and published in the English language, which is hereby incorporated by reference.

FIELD OF THE INVENTION

The present invention relates to wireless communication systems, for example wireless cellular communication systems or wireless local area networks. Methods and devices according to the present invention may be in particular useful in connection with wireless communication systems working at transmission frequencies above 5 GHz, for example 30 GHz.

BACKGROUND OF THE INVENTION

Mobile data and voice communication continues to grow with an increasing demand for higher data transmission performance, for example for high definition video transmissions or gaming applications. Additionally, the increasing popularity of data and voice communication requires that communication needs of a large number of users must be met, even in situations in which a large number of users are located within a small area, for example in sports arenas, shopping malls or large office buildings.

In order to increase data transmission performance and reliability, the so-called multiple-input and multiple-output (MIMO) technology may be used in a wireless radio telecommunication system for transmitting information between a base station and a terminal, for example mobile devices like mobile telephones, mobile computers and tablet computers and stationary devices like personal computers or cash registers.

MIMO systems may use multiple send and receive antennas for wireless communication at the base station as well as at the terminal. The MIMO technology forms the basis for coding techniques which use the temporal as well as the spatial dimension for transmitting information. The enhanced coding provided in MIMO systems allows a spectral and energy efficiency of the wireless communication to be increased.

The spatial dimension may be used by spatial multiplexing. Spatial multiplexing is a transmission technique in MIMO wireless communication to transmit independent and separately encoded data signals, so-called streams, from each of the multiple transmit antennas. Therefore, the spatial dimension is reused, or multiplexed, more than one time.

Additionally or as an alternative, a frequency of the radio signals for the transmission may be increased. The transmission may be based on radio signals with higher frequencies or shorter wavelengths, for example a radio signal with a frequency of several gigahertz or a wavelength of only a few millimetres may be used. When operating at higher frequencies or shorter wavelengths, the aperture of an antenna becomes small. In electromagnetics and antenna theory, antenna aperture or effective area is a measure of how effective an antenna is at receiving the power of radio waves. This may decrease transmission efficiency. For mitigating this, multiple antennas may be used. However, this may raise the problem how to combine the signals from the multiple antennas for best performance.

SUMMARY OF THE INVENTION

In view of the above, there is a need in the art for methods and devices which enable and improve transmissions at higher frequency bands, for example at 20 or 30 GHz, in wireless communication systems.

According to the present invention, this object is achieved by the features of the independent claims. The dependent claims define preferred and advantageous embodiments of the invention.

According to the present invention, a method for operating a wireless communication system is provided. The wireless communication system comprises a base station and a terminal. The terminal comprises a plurality of antenna elements. Furthermore, the terminal provides at least two antenna array configurations. The at least two antenna array configurations comprise a first antenna array configuration and a second antenna array configuration. The first antenna array configuration comprises at least two antenna elements of the plurality of antenna elements, and the at least two antenna elements of the first antenna array configuration have same radio transmission characteristics. The second antenna array configuration comprises at least two antenna elements of the plurality of antenna elements, and the at least two antenna elements of the second antenna array configuration have different radio transmission characteristics. According to the method, a selection process for selecting an antenna array configuration of the at least two antenna array configuration is triggered. The selection process comprises that for each of the at least two antenna array configurations a corresponding figure of merit is determined. The corresponding figure of merit is determined based on corresponding pilot signals received from the base station at the terminal via the corresponding antenna array configuration. Furthermore, the selection process comprises that an antenna array configuration of the at least two antenna array configurations is activated depending on the figures of merit.

The at least two antenna elements of the second antenna array configuration may have different characteristics with respect to each other. Additionally or as an alternative, the at least two antenna elements of the second antenna array configuration may have different radio transmission characteristics with respect to the antenna elements of the first antenna array configuration. For example, at least one antenna element of the at least two antenna elements of the second antenna array configuration may have different radio transmission characteristics than each of the at least two antenna elements of the first antenna array configuration. The different radio transmission characteristics may include for example a different beamforming or a different arrangement of the corresponding antenna elements at the terminal. For example, the first and second antenna array configurations may comprise same antenna elements, but the antenna elements of the first antenna array configuration may be placed at a top side of the terminal and the antenna elements of the second antenna array configuration may be placed at a bottom side of the terminal.

The wireless communication system may comprise for example a wireless cellular telecommunication system or a wireless local area network. Accordingly, in case of a wireless cellular telecommunication system, the terminal may comprise a user equipment like a mobile telephone, a mobile computer, a tablet computer, a wearable device, a mobile accessory, a robotic device, a drone, or a moving cell in for example a vehicle, and the base station may comprise a base station of a cell of the cellular telecommunication system. In case of a wireless local area network, the terminal may comprise a station like a mobile phone, a stationary or mobile computer, a cash register, a printer, a wearable device, a mobile accessory, or a home control equipment, and the base station may comprise an access point of the wireless local area network. The transmission frequency in the wireless communication system for data and voice transmissions between the base station and the terminal may be in a range of 5 to 50 GHz, in particular for example in a range of 30 to 50 GHz.

As described above, the terminal may have multiple antenna array configurations. Furthermore, the base station may be aware of the fact that the terminal has multiple antenna array configurations. For example, the terminal may transmit its possible antenna array configurations to the base station when registering at the base station or when registering the first time in the wireless communication system. Thus, based on the trigger, the selection process is started and the base station transmits pilot signals for each of the supported plurality of antenna array configurations such that the terminal can determine for each antenna array configuration corresponding figures of merit.

As an alternative or additionally, the base station may transmit pilot signals irrespective of the actually supported antenna array configurations of the terminal. For example, the base station may transmit pilot signals for a predefined list or set of antenna array configurations.

Depending on the current characteristics of the radio channel between the base station and the terminal, the different antenna array configurations may each provide a different quality in terms of data transmission rate and reliability which may be expressed by the figures of merit. After determining for each antenna array configuration the corresponding figure of merit, the antenna array configuration which fits best to the current radio channel characteristics may be selected. This may be easily accomplished depending on the determined figures of merit. Thus, transmission of for example voice or data, may be optimised by the selection process with respect to the currently present characteristics of the radio channel between the base station and the terminal. Furthermore, antenna elements which are blocked, for example by parts of a human body using the terminal, may thus be turned off, such that an energy consumption of the terminal may be reduced and a good power efficiency may be achieved.

According to an embodiment, the first antenna array configuration comprises at least one antenna element of the plurality of antenna elements which is not comprised by the second antenna array configuration. Thus, the first antenna array configuration is different from the second antenna array configuration. However, the first antenna array configuration and the second antenna array configuration may share one or more antenna elements of the plurality of antenna elements. Thus, the number of the required antenna elements may be reduced, which may reduce cost and space for the antenna elements.

The first antenna array configuration comprises at least two antenna elements having same radio transmission characteristics, and the second antenna array configuration comprises at least two antenna elements having different radio transmission characteristics. The radio transmission characteristics may relate for example to the polarization of an antenna element, a directionality of an antenna element or an antenna phase pattern.

The at least two antenna elements of the second antenna array configuration having different radio transmission characteristics may differ in at least one of polarization, directionality, coverage area, gain pattern and/or antenna phase pattern. This enables the antenna elements to have independent or so-called orthogonal reception and transmission characteristics which may enable the terminal to use a spatial multiplexing as it is known from MIMO systems. Therefore, the second antenna array configuration may be advantageously selected in a so-called rich environment where a gain of each antenna element is not crucial and a high transmission rate may be achieved by transmitting a plurality of spatially separated data streams to each antenna element or several groups of antenna elements of the second antenna array configuration.

In case the terminal is arranged far apart from the base station or in case a high attenuation of the radio transmission between the base station and the terminal is present, a gain of the antenna elements may be crucial and therefore higher gain may be achieved by a plurality of antenna elements having the same radio transmission characteristics such that a single data stream may be received by the plurality of antenna elements with a high gain and signal-to-noise ratio. Therefore, in these cases the first antenna array configuration may be beneficial.

According to another embodiment, the selection process is triggered based on an expiration of a timer. The timer of may be implemented in the base station or in the terminal or in both. Based on the timer, the selection process may be triggered in regular terms, for example every few milliseconds, for example every 10 ms. Additionally or as an alternative, a current figure of merit may be compared with a threshold value, and if the current figure of merit falls below the preset threshold value, the selection process is triggered. The current figure of merit may be determined depending on a training sequence received from the base station via the currently activated antenna array configuration. Thus, the currently activated antenna array configuration may be continuously monitored, and if a degradation is determined, the selection process is triggered. However, the comparison of the current figure of merit with the threshold value may be performed only in regular terms based on a timer, for example every few milliseconds. Thus, as long as the currently activated antenna array configuration provides sufficient transmission quality indicated by the figure of merit, a selection process may be avoided, and as soon as the quality degrades, the selection process is performed. Additionally or as an alternative, a current figure of merit may be compared with a figure of merit of another antenna array configuration which has been determined in the previous selection process. For example, the figures of merit determined in the previous selection process for each antenna array configuration may be stored and periodically compared with the current figure of merit of the currently activated antenna array configuration. When the figure of merit of the currently activated antenna array configuration falls below one of the previously determined figures of merit of the other antenna array configurations, a new selection process may be initiated.

The figures of merit may be determined by the terminal or by the base station and may be communicated between the terminal and the base station such that either the terminal or the base station may trigger the selection process. The trigger of the selection process may be communicated between the base station and the terminal, or as an alternative, the base station as well as the terminal may determine the triggering of the selection process individually based on the same criteria such that the selection process is triggered in the terminal and the base station at the same time. Furthermore, the selection process may be triggered in the base station only and upon reception of the pilot signals from the base station the terminal may start the selection process for selecting an antenna array configuration automatically.

As indicated above, the figure of merit indicates the quality achievable with each of the antenna array configurations. Suitable parameters for indicating the quality may comprise for example a received signal strength, a rank of the transmission, a transmission bandwidth, a transmission bit rate, and a received signal quality indicator. The term "rank" as it is used within this description indicates the number of spatially separated data transmission streams between the user equipment and the base station. For example, if the transmitter is equipped with Nt antennas and the receiver has Nr antennas, the maximum spatial multiplexing order Ns (the number of streams or the rank) is Ns=min (Nt, Nr). This means that Ns streams can be transmitted in parallel, ideally leading to an Ns increase of the spectral efficiency (the number of bits per second and per Hz that can be transmitted over the wireless channel). For example, a system with a base station having two antennas and a terminal having two antennas has a rank of 2 and is also called 2×2 system, indicating the number of antennas at the base station and at the terminal. However, the rank is limited by the device having the lower number of antennas.

According to another embodiment of the method, a training sequence from the base station is received at the terminal via the activated antenna array configuration. Based on the received training sequence, antenna configuration parameters for the antenna elements of the activated antenna array configuration are determined. For example, the terminal may include a large number of antenna elements, for example several tens or even in excess of one hundred antenna elements with associated receiver circuitry. Depending on the selected antenna array configuration, the plurality of antenna elements of the terminal allow radio energy to be spatially focussed in transmissions as well as a directional sensitive reception which improves spectral efficiency and radiated energy efficiency, or a gain of the transmitted radio signal may be increased. In order to adapt the transmit and receive signals at each individual antenna element, a terminal logic needs information about radio channel properties between the base station and the antenna elements of the terminal. The training sequence can be used for this purpose which allows the terminal to set antenna configuration parameters for transmitting signals, so as to focus radio energy at the base station, or for receiving radio signals from the base station, so as to focus reception sensitivity to the base station. Thus, focus may mean both phase align contributions with different path length and transmit only in directions that will reach the base station, respectively.

According to another embodiment of the present invention, an operational mode preference is transmitted from the terminal to the base station. The operational mode preference is determined by the terminal and indicates a preferred transmission rank for a payload transmission between the terminal and the base station. At the base station, the pilot signals are generated depending on the operational mode preference. For example, the terminal may determine on its own, for example based on movement information, that the terminal is approaching the base station. Therefore, the terminal may prefer to operate in a higher rank mode using for example the second antenna array configuration which enables to receive spatially separated data streams with larger angular separation than covered by the current aperture. This information may be transmitted from the terminal to the base station and the base station may generate corresponding pilot signals to validate that the higher rank operation is suitable. Thus, the selection process may be triggered and shortened to save transmission resources.

Furthermore, according to the present invention, a terminal for a wireless communication system is provided. The wireless communication system comprises a base station. The terminal comprises a plurality of antenna elements and a logic coupled to the plurality of antenna elements. The plurality of antenna elements may be configured in at least two antenna array configurations. The at least two antenna array configurations comprise a first antenna array configuration comprising at least two antenna elements of the plurality of antenna elements having same radio transmission characteristics, and a second array configuration comprising at least two antenna elements of the plurality of antenna elements having different radio transmission characteristics. The logic is configured to determine, based on a trigger event, for each of the at least two antenna array configurations a corresponding figure of merit. The corresponding figure of merit is determined based on corresponding pilot signals received from the base station at the terminal via the corresponding antenna array configuration. Furthermore, the logic is configured to activate an antenna array configuration of the at least two antenna array configurations depending on the figures of merit.

The terminal may be configured to perform the above described method and the embodiments thereof. Therefore, the terminal also comprises the above described advantages.

For example, the user equipment may comprise a mobile telephone, a mobile computer, a tablet computer, a smart wearable device or a smart mobile accessory. A smart mobile accessory or a smart wearable device may comprise a wearable computer, also known as body-borne computer or simply wearable, which is a miniature electronic device that may be worn by a user under, with or on top of clothing.

Additionally, according to the present invention, a base station for a wireless communication system provided. The wireless communication system comprises a terminal comprising a plurality of antenna elements. The terminal provides at least two antenna array configurations comprising a first antenna array configuration comprising at least two antenna elements of the plurality of antenna elements having same radio transmission characteristics, and a second antenna array configuration comprising at least two antenna elements of the plurality of antenna elements having different radio transmission characteristics. The base station comprises at least one antenna into logic coupled to the at least one antenna. The logic is configured to send, based on a trigger event, for each of the at least two antenna array configurations of the terminal corresponding pilot signals via the at least one antenna to the terminal. The pilot signals enable the terminal to determine for each of the at least two antenna array configurations a corresponding figure of merit. Therefore, the base station is configured to perform the above-described method or any one of the method's embodiments described above and comprises therefore the above-described advantages.

Furthermore, the present invention provides a wireless communication system comprising a terminal as described above and a base station as described above. The wireless communication system may comprise for example a cellular wireless telecommunication system or a wireless local area network.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise.

Figure 1:
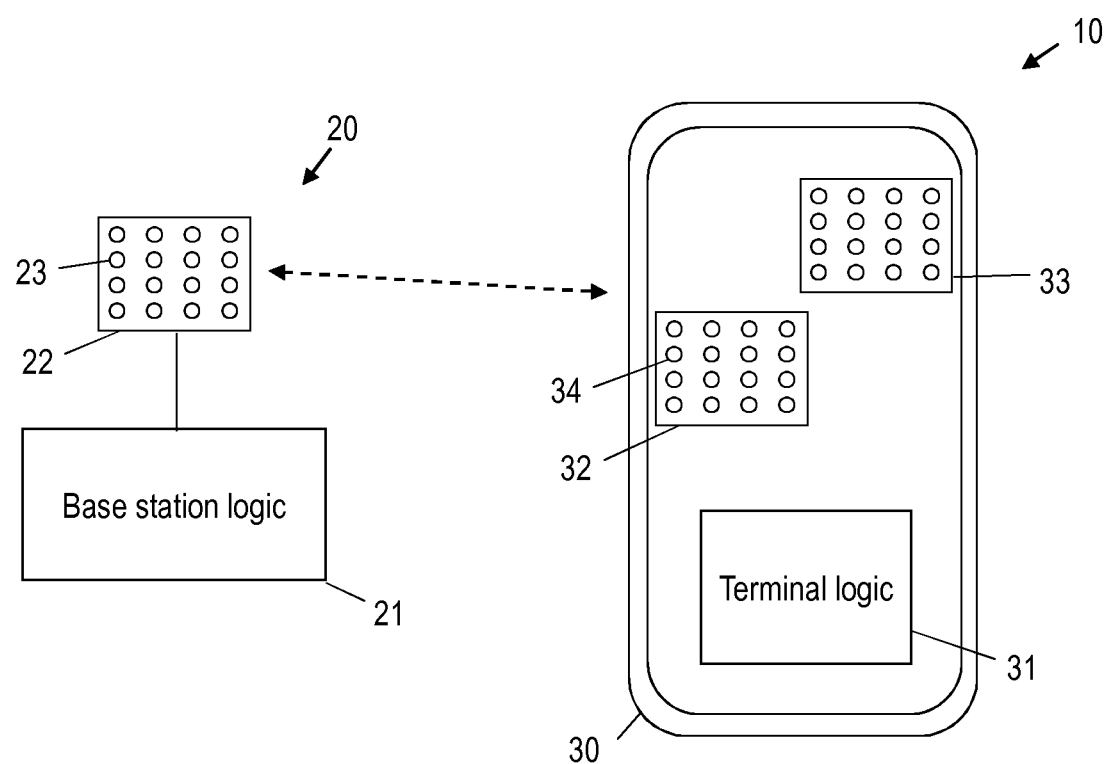
FIG. 1 shows schematically a wireless communication system according to an embodiment of the present invention.

FIG. 1 shows a communication system 10 according to an embodiment of the present invention. The communication system 10 may be for example a wireless cellular communication system or a wireless local area network system. The communication system 10 comprises a base station 20, for example a base station of a cell of the cellular communication system or an access point of the wireless local area network system. The communication system 10 comprises furthermore a terminal 10 which is arranged within a radio communication range of the base station 20. The terminal 10 may comprise for example a user equipment like a mobile telephone, a tablet computer, a wearable device or a mobile accessory. Furthermore, the terminal may comprise for example a stationary or mobile station like for example a cash register, a credit card reader, a control device of a home or office automation system, a robotic device, a drone, or a moving cell in for example a vehicle. Although FIG. 1 shows only one terminal 30, in the communication system 10 a plurality of terminals may be arranged and may be configured to communicate and operate with the base station 20, as will be described below.

The base station 20 comprises a base station logic 21 and an antenna structure 22. The base station logic 21 may comprise for example a controller, computer or microprocessor. The antenna structure 22 may comprise a single antenna or a plurality of antenna elements, which are indicated by circles in FIG. 1. One exemplary antenna element of the plurality of antenna elements is indicated by reference sign 23. The antenna elements 23 may be arranged in a two dimensional or three-dimensional spatial array on a carrier. The base station 20 may comprise furthermore associated (not shown) transceivers for the antenna elements 23. The base station 20 may operate in multiple-input and multiple-output (MIMO) mode. Accordingly, the base station 20 may have several tens or in excess of one hundred antenna elements 23.

The terminal 30 comprises a plurality of antenna elements which are indicated in FIG. 1 by circles, one of the circles being referenced by reference sign 34. The plurality of antenna elements may be arranged in a one-, two- or three-dimensional array or in groups of linear, two-dimensional or three-dimensional arrays. The plurality of antenna elements may be arranged at different locations of the terminal 30, for example some of the antenna elements may be arranged at a top side of the terminal 30 and some may be arranged at a bottom side of the terminal 30. The terminal 30 may comprise furthermore associated (not shown) transceivers for the antenna elements 34. Additionally, the terminal 30 comprises a terminal logic 31, for example a controller or a microprocessor, which is coupled to the transceivers for the antenna elements 34. The terminal 30 may comprise some more components, for example a graphical user interface and a battery, but these components are not shown in FIG. 1 for clarity reasons.

The antenna elements 34 may have different radio transmission characteristics, for example some antenna elements 34 may have a different polarization than others, some antenna elements may have different directionality than others, and some antenna elements may have a different antenna phase pattern than others. In operation, the terminal logic 31 may be configured to activate one of a plurality of different antenna array configurations. For example, the plurality of different antenna array configurations may comprise a first antenna array configuration 32 and a second antenna array configuration 33. The first antenna array configuration comprises a plurality of antenna elements having same radio transmission characteristics. The second antenna array 33 comprises a plurality of antenna elements having different radio transmission characteristics.

The different radio transmission characteristics enable the second antenna area 33 to communicate simultaneously several data streams at a higher rank, as it is known from MIMO systems. In contrast to this, the same radio transmission characteristics of the antenna elements of the first antenna array configuration 32 enables a rank one communication only. Although FIG. 1 shows the first antenna array configuration 32 with antenna elements which are completely separated from the antenna elements of the second antenna array configuration 33, the antenna elements may be shared at least partly by the two antenna array configurations.

Figure 2:
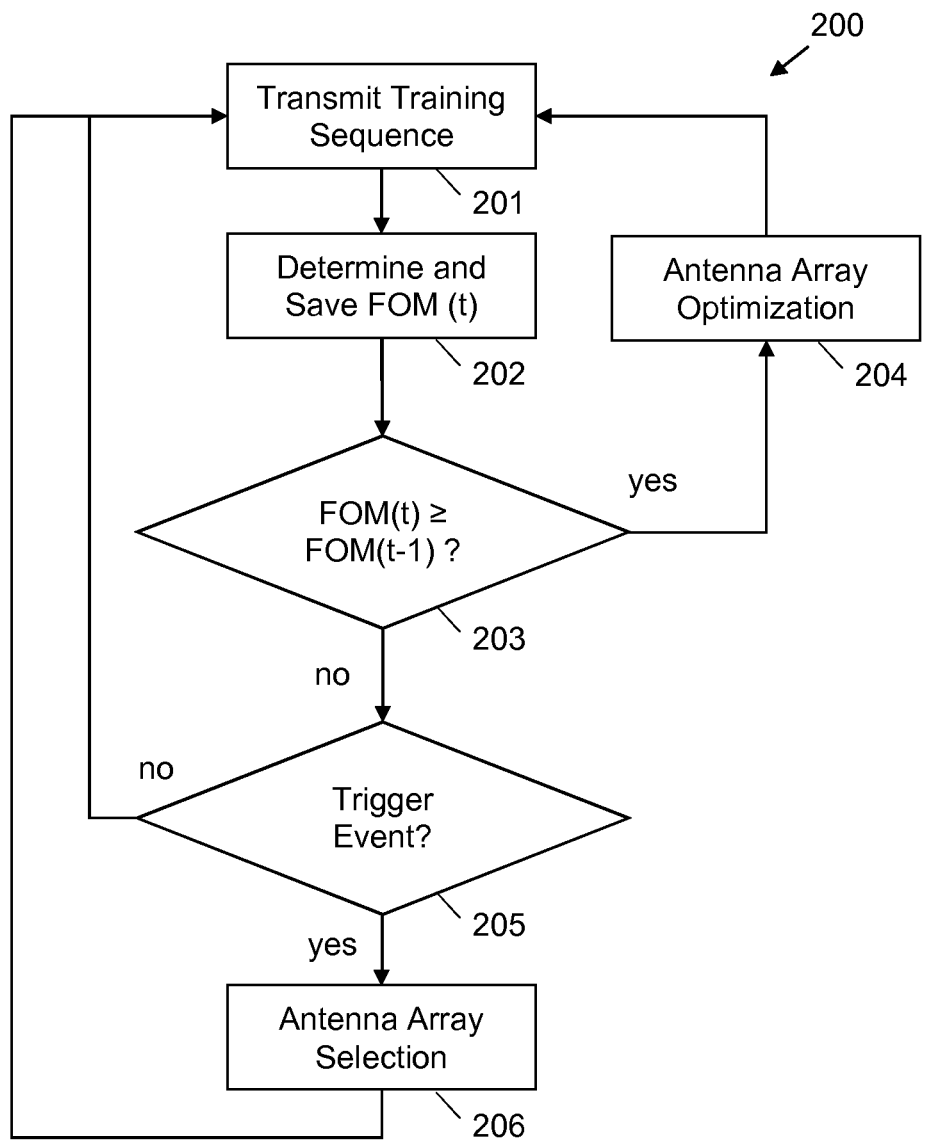
FIG. 2 shows a flow chart comprising method steps according to an embodiment of the present invention.

Operation of the base station 20 in connection with the terminal 30 will be described in more detail in connection with FIG. 2.

The communication system 10 may operate at higher frequency bands in the range of for example 5 to 50 GHz, for example at 30 GHz. When operating at such high frequencies, the aperture of an antenna element becomes small. Therefore, the base station 20 as well as the terminal 30 comprise a plurality of antenna elements 23, 34. However, the signals of the different antenna elements have to be combined for best performance. For example, when a signal level is low at an edge of a cell of the cellular communication network, there is typically no multipath transmission between the base station and the terminal, as possible multipath components are most likely very weak and therefore not useful. Rather, only a single path, typically in the line of sight, is available. An operational mode of transmission between the base station 20 and the terminal 30 is a rank one, and from the terminal's perspective the best antenna design is an array of antenna elements having similar gain patterns. However, when the terminal 30 is closer to the base station 20, the signal-to-noise ratio may become larger and different multipath components may be used to operate at a higher rank. For enabling such a higher rank operation, the terminal 30 may use an antenna array configuration with antenna elements having different radio transmission characteristics.

For enabling the terminal 30 and the base station 20 to operate in a most beneficial mode, a method 200 for a closed-loop array antenna array configuration selection and an antenna element parameter optimization for adapting to current channel characteristics is performed. The base station 20 is aware that the terminal 30 may have different antenna array configurations. Assuming that the terminal 30 has activated one of the antenna array configurations, the base station 20 transmits in step 201 a training sequence. In step 202 a current figure of merit (FOM) is determined and stored. In step 203 the current figure of merit is compared with a previously determined figure of merit. The figure of merit may indicate the quality and performance of the current data transmission and may comprise for example a received signal strengths, a rank of the transmission, a transmission bandwidth, a transmission bit rate and/or a received signal quality indicator. In case the transmission quality has not degraded compared to the previously determined figure of merit, i.e. the current figure of merit indicates at least the quality of the previous figure of merit, the activated antenna array configuration is optimised based on the transmitted training sequence in step 204 and the method continues in step 201.

In case in step 203 is determined that the transmission quality has degraded, the method 200 is continued in step 205. In step 205 is determined if a trigger event for starting a selection process for selecting an antenna array configuration has occurred. The trigger event evaluated in step 205 may comprise for example the degradation of the figure of merit determined in step 203, a comparison of the current figure of merit with a predetermined threshold value, and/or an expiration of a timer in the base station or in the terminal. For example, the selection process for selecting an antenna array configuration may be triggered if the current figure of merit is below a certain predefined threshold value and a timer in the terminal has expired. In case of no trigger event the method 200 continues in step 201. In case of a trigger event the selection process for selecting an antenna array configuration is initiated in step 206. In the selection process in step 206 for each of the supported antenna array configurations of the terminal 30 a corresponding figure of merit is determined based on corresponding pilot signals received from the base station 20 at the terminal 30 via the corresponding antenna array configuration. One of the supported antenna array configurations of the terminal 30 is then activated based on the determined figures of merit.

For example, as shown in FIG. 1, the terminal 30 may have two antenna array configurations 32 and 33. The base station 20 is aware of the fact that the terminal 30 has these two antenna array configurations. Occasionally, cyclic, or triggered by certain figure of merit the values, the base station 20 enables the terminal 30 to change the current antenna array configuration. Additionally or as an alternative, the terminal 30 may request the base station to enable a change the current antenna array configuration, and additionally the terminal may propose a preferred operational mode, for example a preferred rank of the communication with the base station 20. Based on the trigger event or terminal request, the base station 20 transmits pilot signals which enable the terminal 30 to assess some or more of the supported antenna array configurations. The terminal 30 may report the determined figures of merit to the base station 20, and the base station 20 may decide or propose to change to one of the antenna configurations and reports this to the terminal 30. Furthermore, the terminal 30 may communicate to the base station 20 how many and/or which antenna configurations the terminal 30 supports. As an alternative, the terminal 30 may select and activate an antenna array configuration depending on the determined figures of merit and may report the selected antenna array configuration to the base station. Activating an antenna array configuration may imply for example the switch between different antenna arrays with different properties, a change of a number of antenna elements or a change of some of the antenna elements within an array.

After an antenna array configuration has been activated, an array optimization process (steps 201 to 204) adapts the activated antenna array configuration to the current transmission channel characteristics. The array optimization process may include balancing the power distribution to the antenna elements and phase offset.

For example, the terminal 30 may have two antenna array configurations, a first antenna array configuration with same antenna elements and a second antenna array configuration with different antenna elements. The different antenna elements may differ from each other such that they may receive separate data streams at the same time without being disturbing each other. This may be accomplished for example by different polarisation or directionality. Such antenna elements are also called orthogonal antenna elements.

In the selection process, the base station 20 may transmit subsequently pilot signals to assess both antenna array configurations to see which one is the better. In a rich environment with multipath propagation this will most likely be the antenna array configuration with orthogonal antenna elements and after testing both configurations the better one is selected. If the terminal 30 resides in an area with weaker signal level and reduced richness, the bit error rate will increase and the base station 20 may change to a lower rank operation. At some point, the base station 20 may request the terminal 30 to test a different antenna configuration.

Finally, it is to be noticed that in areas where multiple base stations or access points are available, the above-described method may be performed in parallel for each combination of terminal and base station or access point. The terminal may propose or order a simultaneous connection to some of the base stations or access points and the terminal may use different antenna array configurations to scan for other base stations or access points and then return to the best for the current connection.

The invention claimed is:

1. A method for operating a wireless communication system, the wireless communication system comprising a base station and a terminal, the terminal comprising a plurality of antenna elements, wherein the terminal provides at least two antenna array configurations comprising a first antenna array configuration comprising at least two antenna elements of the plurality of antenna elements having same radio transmission characteristics and a second antenna array configuration comprising at least two antenna elements of the plurality of antenna elements having different radio transmission characteristics, the method comprising:

triggering a selection process for selecting an antenna array configuration of the at least two antenna array configurations, the selection process comprising:

determining for each of the at least two antenna array configurations a corresponding figure of merit, the corresponding figure of merit being determined based on corresponding pilot signals received from the base station at the terminal via the corresponding antenna array configuration, and activating an antenna array configuration of the at least two antenna array configurations depending on the figures of merit.

2. The method according to claim 1, wherein the first antenna array configuration comprises at least one antenna element of the plurality of antenna elements which is not comprised by the second antenna array configuration.

3. The method according to claim 1, further comprising:
receiving, at the terminal, a training sequence from the base station via the activated antenna array configuration, and
determining antenna configuration parameters for the antenna elements of the activated antenna array configuration based on the received training sequence.

4. The method according to claim 1, wherein the selection process is triggered based on at least one of:
an expiration of a timer in the base station,
an expiration of a timer in the terminal,
a comparison of a current figure of merit with a threshold value, the current figure of merit being determined depending on a training sequence received from the base station via the activated antenna array configuration,
a comparison of a current figure of merit with a figure of merit of another antenna array configuration determined in a previous selection process, and
the terminal requesting an access to a further base station.

5. The method according to claim 1, wherein the figure of merit comprises at least one of:
a received signal strength,
a rank of the transmission,
a transmission bandwidth,
a transmission bit rate, and
a received signal quality indicator.

6. The method according to claim 1, wherein the at least two antenna elements having different radio transmission characteristics differ in at least one of:
a polarization,
a directionality, and
an antenna phase pattern.

7. The method according to claim 1, wherein a transmission frequency in the wireless communication system for transmissions between the base station and the terminal is in a range of 5 to 50 GHz.

8. The method according to claim 1, further comprising:
transmitting an operational mode preference from the terminal to the base station, the operational mode preference being determined by the terminal and indicating a preferred transmission rank for a payload transmission between the terminal and the base station, and
generating, at the base station, the pilot signals depending on the operational mode preference.

9. A terminal for a wireless communication system, the wireless communication system comprising a base station, the terminal comprising:
a plurality of antenna elements, wherein the plurality of antenna elements are configurable in at least two antenna array configurations, the at least two antenna array configurations comprising a first antenna array configuration comprising at least two antenna elements of the plurality of antenna elements having same radio transmission characteristics and a second antenna array configuration comprising at least two antenna elements of the plurality of antenna elements having different radio transmission characteristics, and a logic coupled to the plurality of antenna elements and configured to determine, based on a trigger event, for each of the at least two antenna array configurations a corresponding figure of merit, the corresponding figure of merit being determined based on corresponding pilot signals received from the base station at the terminal via the corresponding antenna array configuration, and activate an antenna array configuration of the at least two antenna array configurations depending on the figures of merit.

10. The terminal according to claim 9, wherein the terminal is configured to perform the method of claim 1.

11. The terminal according to claim 10, wherein the terminal comprises at least one device of a group comprising:
a mobile telephone,
a mobile computer,
a tablet computer,
a wearable device, and
a mobile accessory.

12. A base station for a wireless communication system, the wireless communication system comprising a terminal, wherein the terminal comprises a plurality of antenna elements and provides at least two antenna array configurations comprising a first antenna array configuration comprising at least two antenna elements of the plurality of antenna elements having same radio transmission characteristics and a second antenna array configuration comprising at least two antenna elements of the plurality of antenna elements having different radio transmission characteristics, the base station comprising:
at least one antenna, and
a logic coupled to the at least one antenna and configured to send, based on a trigger event, for each of the at least two antenna array configurations of the terminal via the at least one antenna corresponding pilot signals to the terminal, which enable the terminal to determine for each of the at least two antenna array configurations a corresponding figure of merit.

13. The base station according to claim 12, wherein the base station is configured to perform the method of claim 1.

14. A wireless communication system, comprising:
a plurality of antenna elements, wherein the plurality of antenna elements are configurable in at least two antenna array configurations, the at least two antenna array configurations comprising a first antenna array configuration comprising at least two antenna elements of the plurality of antenna elements having same radio transmission characteristics and a second antenna array configuration comprising at least two antenna elements of the plurality of antenna elements having different radio transmission characteristics, and
a logic coupled to the plurality of antenna elements and configured to determine, based on a trigger event, for each of the at least two antenna array configurations a corresponding figure of merit, the corresponding figure of merit being determined based on corresponding pilot signals received from the base station at the terminal via the corresponding antenna array configuration, and activate an antenna array configuration of the at least two antenna array configurations depending on the figures of merit; and
a base station according to claim 12.

* * * * *